United States Patent [19]
Dotan

[11] Patent Number: 6,077,555
[45] Date of Patent: Jun. 20, 2000

[54] COOKING APPLIANCE AND METHOD PARTICULARLY USEFUL FOR FRYING OR STEAMING FOOD

[75] Inventor: Simon Dotan, Natania, Israel

[73] Assignee: Ann Grant, New York, N.Y.; a part interest

[21] Appl. No.: 09/139,579

[22] Filed: Aug. 25, 1998

[51] Int. Cl.[7] .............................. A47J 37/00; A47J 37/12
[52] U.S. Cl. .............................. 426/438; 99/330; 99/348; 99/403; 99/407; 99/409; 426/441; 426/510; 426/511; 426/520; 426/523
[58] Field of Search .................... 99/330–336, 403–417, 99/348, 427; 210/167, DIG. 8; 126/391, 219; 426/438, 441, 510, 511, 520, 523; 366/241, 255, 256, 332

[56] References Cited

U.S. PATENT DOCUMENTS

| | | | |
|---|---|---|---|
| 4,873,920 | 10/1989 | Yang | 99/409 |
| 4,901,633 | 2/1990 | De Longhi | 99/348 X |
| 5,010,805 | 4/1991 | Ferrara | 99/353 |
| 5,146,841 | 9/1992 | Zittel | 99/348 |
| 5,165,329 | 11/1992 | Jacob et al. | 99/336 |
| 5,379,684 | 1/1995 | Ettridge | 99/407 X |
| 5,524,527 | 6/1996 | Dumoux et al. | 99/403 X |
| 5,535,665 | 7/1996 | Wong | 99/348 |
| 5,543,166 | 8/1996 | Masel et al. | 426/523 |
| 5,584,234 | 12/1996 | Baillieul et al. | 99/403 |
| 5,611,265 | 3/1997 | Ronci et al. | 99/410 X |
| 5,771,781 | 6/1998 | Sham | 99/336 |

*Primary Examiner*—Timothy Simone
*Attorney, Agent, or Firm*—Benjamin J. Barish

[57] ABSTRACT

An appliance for cooking food articles includes a receptacle for receiving a quantity of food articles to be cooked, and a sufficient quantity of cooking liquid to only partially immerse the food articles therein; a heater for heating the cooking liquid and the food articles when received therein; a paddle movably mounted with respect to the receptacle so as to be movable therein; and a periodically-reversing drive for driving the paddle back and forth in the receptacle to move the food articles therein back and forth through the cooking liquid. The appliance is particularly useful for frying as it causes all the surfaces of the food article to be crisply fried without absorbing undue quantities of the frying oil. The appliance is also useful for other applications including steaming food, cooking rice, and popping corn.

19 Claims, 2 Drawing Sheets

COOKING APPLIANCE AND METHOD PARTICULARLY USEFUL FOR FRYING OR STEAMING FOOD

FIELD AND BACKGROUND OF THE INVENTION

The present invention relates to a cooking appliance and method particularly useful for frying or steaming food. The inventions is especially useful as a frying appliance for frying various types of food articles, such as potatoes, pieces of chicken, and the like, and is therefore described below with respect to such an application; but as will also be described below, the appliance and method could also be used for other applications including steaming food, cooking rice, and popping corn.

Many types of frying appliances have been developed and are described in the literature, for example in U.S. Pat. Nos. 4,873,920, 4,901,633, 5,010,805, 5,146,841, 5,165,329, 5,379,684, 5,524,527, 5,543,166, 5,584,234, and 5,611,265. In most of these appliances, the food articles are completely immersed in hot oil during the frying process thereby causing them to become soaked in the oil. This detracts from the taste and is also generally considered unhealthy. Moreover, such appliances require large quantities of frying oil, long frying times, and large quantities of energy for heating the frying oil. While the foregoing drawbacks have been previously recognized, e.g., see the above-cited U.S. Pat. No. 5,543,166, the techniques to overcome these drawbacks have generally involved large, complicated constructions which are expensive to produce, bulky to ship and store, and/or inconvenient to use.

OBJECTS AND BRIEF SUMMARY OF THE INVENTION

An object of the present invention is to provide a cooking appliance, and also a method of cooking, which may be used for frying food articles in a manner having advantages in the above respects. Another object of the present invention is to provide a cooking appliance, and also a cooking method, which may be used not only for frying food articles, but which may be used for many other applications, including steaming food articles, preparing cooked rice, popping corn, and the like.

According to one aspect of the present invention, there is provided an appliance for cooking food articles, comprising: a receptacle for receiving a quantity of the food articles to be cooked, and a sufficient quantity of a cooking liquid to only partially immerse the food articles therein; a heater for heating the cooking liquid and the food articles when received therein; a paddle movably mounted with respect to the receptacle so as to be movable therein; and a periodically-reversing drive for driving the paddle back and forth in the receptacle to move the food articles therein back and forth through the cooking liquid.

According to further features in the preferred embodiment of the invention described below, the paddle is of an open frame construction having a large opening bordered by a bottom strip which is movable back and forth along the receptacle to cause the food articles to tumble through the large opening.

According to still further features in the described preferred embodiment, the paddle is pivotally mounted with respect to the receptacle, and the periodically-reversing drive is an oscillating drive for oscillating the paddle in the receptacle. Also, the receptacle is of a semi-cylindrical configuration, having a pair of spaced vertical end walls, a semi-cylindrical bottom wall, and an open top. The paddle is pivotally mounted along the center line of the open top of the receptacle perpendicularly to and between the vertical end walls.

As will be described more particularly below, an appliance constructed in accordance with the foregoing features may be built with a few simple parts which can be produced in volume, at low cost, and in a compact form requiring a minimum of space. By using such an appliance as a frying appliance, one is able to produce crisply-fried food articles utilizing relatively small quantities of oil, thereby providing the additional advantages of better taste, better health, lower consumption of oil and electricity, and shorter frying time. However, such an appliance may also be used for steaming various food articles or for preparing steamed rice, in which case the cooking liquid would be water. The appliance could also be used for still other applications, such as popping corn, in which case the cooking liquid would be an oil of which a minimum quantity would also be required.

According to another aspect of the present invention, there is provided a method of cooking food articles comprising introducing the food articles into a receptacle; introducing a relatively small quantity of cooking liquid into the receptacle sufficiently only to partially immerse the food articles therein; heating the cooking liquid to a temperature sufficient to cook the food articles therein; and actuating a periodically-reversing drive for periodically driving a paddle back and forth in the receptacle to move the food articles therein back and forth through the cooking liquid. and the paddle is of rectangular shape and is pivotally mounted along the center line of the open top of the receptacle.

As indicated above, and described more particularly below, the method may be used not only for producing crisply fried food articles retaining a minimum quantity of frying oil, but also for steaming food articles of various types including rice, and also for popping corn with a minimum quantity of oil.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
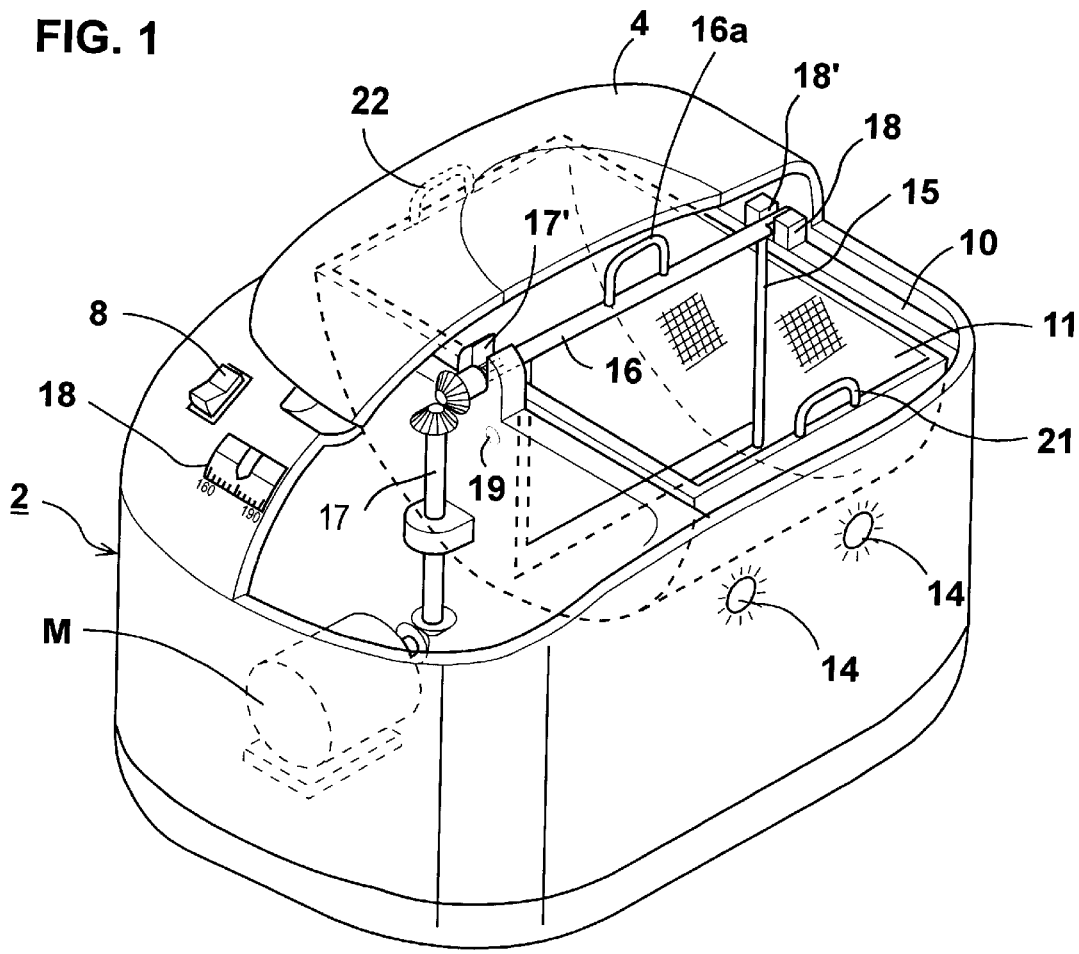
FIG. 1 is a perspective view, partly cut away, illustrating one form of cooking appliance constructed in accordance with the present invention.
Figure 2:
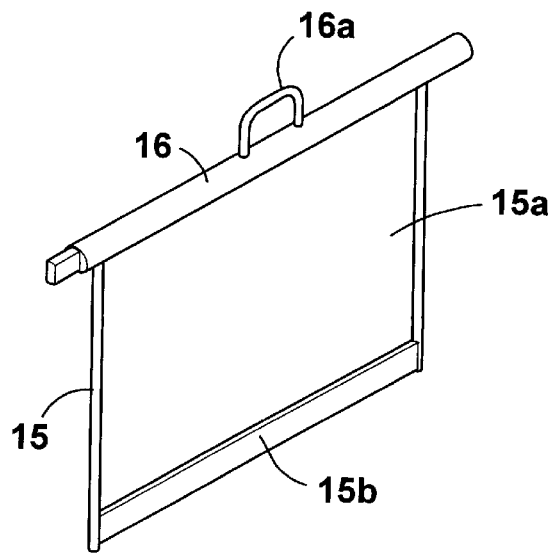
FIG. 2 illustrates the paddle included in the appliance of FIG. 1.
Figure 3:
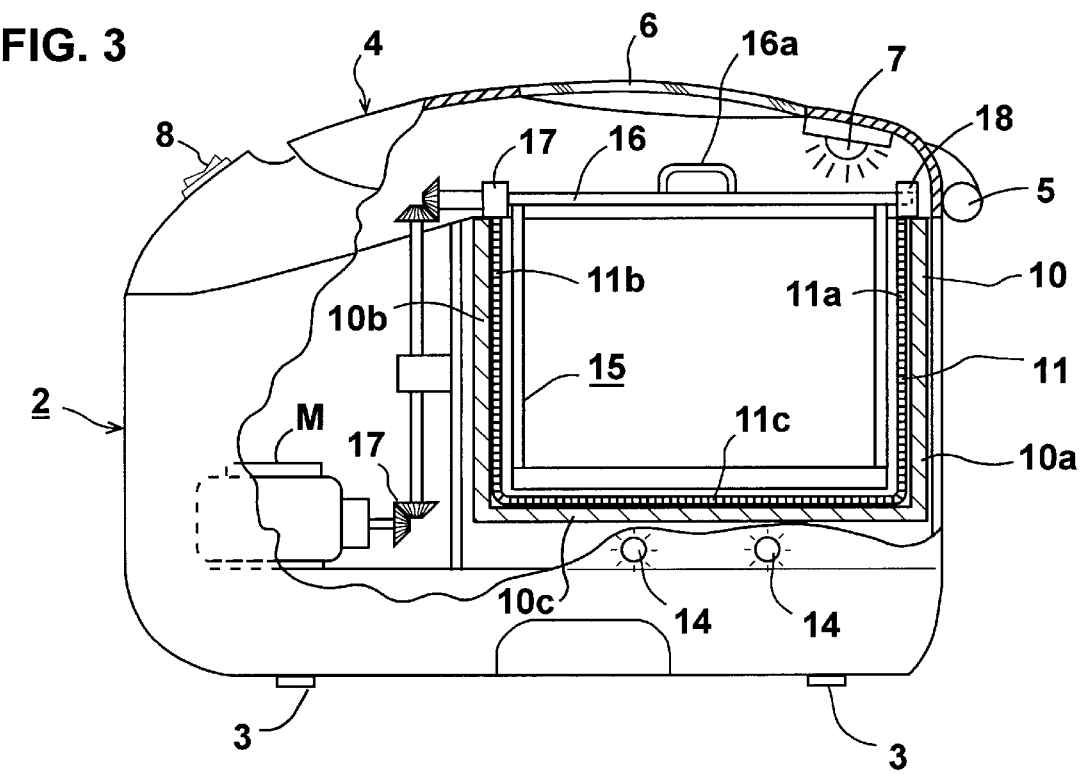
FIG. 3 is a front elevational view, partly cut away, of the appliance of FIG. 1.

The cooking appliance illustrated in the drawings comprises a housing, generally designated 2, having feet 3 for supporting the housing on a flat horizontal surface. The upper open end of housing 2 is closed by a cover 4 hinged at one side 5 to provide access into the interior of the housing. Cover 4 includes a transparent window 6 to permit viewing the interior of the housing when the cover is closed. The cover further includes a lamp 7, which is preferably a heating lamp (such as a halogen lamp) for purposes of both illuminating the interior of the housing, as well as for providing additional heat to the food articles being cooked within the housing.

A receptacle 10 is located within housing 2 and is provided with a removable screen basket 11. Both receptacle 10 and its screen basket 11 are of a semi-cylindrical configuration, open at the top. Thus, receptacle 10 and its screen basket 11 include a pair of spaced end walls 10a, 10b, 11a, 11b, and a semi-cylindrical bottom wall 10c, 11c. Both the receptacle 10 and its screen basket 11 are of a size to receive a quantity of the food articles 12 (FIG. 5) to be cooked (e.g., potatoe sticks, potatoe slices, chicken pieces to be fried, etc.), but only a sufficient quantity of cooking liquid 13, e.g., frying oil, only to partially immerse the food articles in the cooking liquid.

Housing 2 further includes one or more heating elements 14 underlying receptacle 10 for heating the cooking liquid 13 within the receptacle. Heating elements 14 may be any conventional heaters, such as resistance heaters, but are preferably halogen lamps.

A paddle 15 is pivotally mounted within receptacle 10 and its removable screen basket 11. For this purpose, paddle 15 is secured to a shaft 16 which is pivotally mounted between a pair of posts 17, 18, aligned with the center line of the open tops of the receptacle 10 and its screen basket 11. Paddle 15 is of an open construction and of rectangular configuration. It has a large rectangular opening 15a bordered by a bottom strip 15b. Paddle 15 extends perpendicularly between the vertical end walls 10a, 10b and 11a, 11b of the receptacle 10 and screen basket 11, respectively and is of a length slightly less than the radius of the receptacle 10 and screen basket 11, such that the bottom strip 15b of the paddle is slightly spaced from the screen basket, as shown particularly in FIG. 4.

Figure 4:
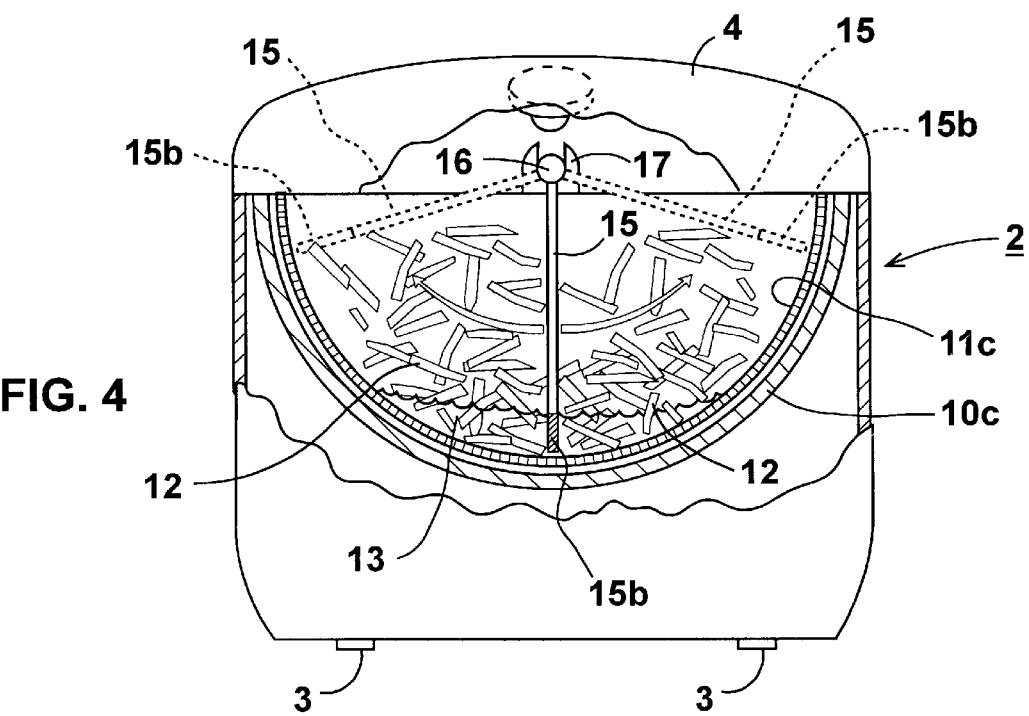
FIG. 4 is an end elevational view, partly cut away, of the appliance of FIG. 1.

As also shown in FIG. 4, paddle 15 may be oscillated in both directions from its normal vertical position. For this purpose, its shaft 16 is coupled to an electrical motor M within housing 2 via a gear transmission 17, to pivot the paddle first in one direction as shown by the right arrow in FIG. 4, and then in the opposite direction as shown by the left arrow in FIG. 4.

As will be described more particularly below, the cooking liquid 13 at the bottom of the receptacle 10 forms a shallow pool, only sufficient to partially immerse the food articles 12. Accordingly, the back-and-forth oscillating movement of paddle 15, particularly its bottom strip 15b, causes the food articles to tumble through the large opening 15a of the paddle. This movement not only continuously changes the orientation of the food articles in the cooking liquid, but also continuously raises some of the food articles out of the shallow pool to permit the liquid to drain from such raised food articles back into the pool at the bottom of the receptacle.

As indicated earlier, the appliance illustrated in the drawings is particularly useful for frying food articles, in which case the cooking liquid 13 would be a frying oil. When the appliance is used for frying purposes, the back and forth movement of the paddle 15 through the shallow pool of frying oil causes all the surfaces of the food articles to be crisply fried, while minimizing the quantity of oil absorbed by the food articles.

The illustrated appliance may also be used for steaming food articles, such as various types of vegetables. When used for this application, the cooking liquid 13 would be water. A minimal amount of water would be required for this purpose since the natural water included in the food articles would also be steamed. Such an appliance may also be used for cooking rice, in which case the cooking liquid 13 would also be water.

The same appliance could also be used for popping corn, in which case the food articles would be corn kernels, and the cooking liquid would be an oil such as used for popping corn. It has been found that when such an appliance is used for popping corn, very few of the corn kernels remain unpopped, and a minimum quantity of oil is absorbed in the popped corn.

Housing 2 also includes a temperature selector 18 (FIG. 1) enabling the user to select the temperature according to the particular application. A temperature sensor, such as shown at 19 in FIG. 1, is included in the electrical circuitry controlling the heater lamps 14 and 7 to control the heater circuit according to the preselected temperature.

Receptacle 10 is preferably made of heavy aluminum having a high heat absorbing capacity. Its inner and outer surfaces are preferably blackened to increase their heat absorption from the heating lamps 14 and 7.

Screen basket 11 is conveniently removable from receptacle 10 to permit removing the food articles from the cooking liquid while the excess liquid is retained within the receptacle. For this purpose, screen basket 11 includes a pair of handles 21, 22 at its opposite sides which may be gripped by a user for removing the screen basket and the food articles therein. Instead of having two handles 21, 22, the screen basket could be provided with a single handle grippable with one hand by the user. Also, the screen basket could be provided with a retainer arrangement for retaining it in a lifted position to permit the oil to drain back into the receptacle.

Paddle 15 is also removable to permit removing the screen basket 11. For this purpose, the two posts 17, 18 pivotally mounting shaft 16 of paddle 15 are formed with edge slots, 17', 18' flared outwardly to permit the shaft 16, and the paddle 15 thereof, to be conveniently received in, and removed from, these posts slots. To facilitate removal of the paddle, shaft 16 may be provided with a handle 16a, or with a shallow U-bend at its center to serve as a handle.

The manner of using the appliance illustrated in the drawings will be apparent from the above description. Thus, a relatively small quantity of cooking liquid is introduced into the receptacle 10 so as to form a shallow pool covering only the bottom of the receptacle, as shown in FIG. 4. Whenever make-up liquid is required, only a sufficient quantity is added to maintain this level of the liquid. The food articles 12 to be cooked are introduced into the screen basket 11 of receptacle 10.

Paddle 15 is oscillated by motor M, as shown by the arrows in FIG. 4, to move the food articles back-and-forth through the cooking liquid in the bottom of the receptacle and to cause the food articles to tumble in and out of the cooking liquid. This process is continued until the cooking of the food articles is completed, at which time they may be removed by first removing paddle 15, and then removing or lifting the screen basket 11 containing the food articles.

The illustrated appliance can therefore be used for many different applications. Thus, when used as a frying appliance, the cooking liquid 13 would be a frying oil, and the tumbling of the food articles within it, during the back-and-forth movements of the paddle 15, would cause all the surfaces of the food articles to be crisply fried while minimizing the amount of oil absorbed. If the appliance is to be used for steaming food articles, the cooking liquid 13 would be water, and only a minimum quantity would be required since the natural water in the food articles themselves would also be steamed. The illustrated appliance has been found particularly useful for cooking rice, in which case the cooking liquid 13 would also be water.

A still further application of the illustrated appliance is for popping corn. When so used, it has been found that a minimum quantity of oil is needed for popping the corn, that a minimum quantity of oil is absorbed within the popped corn, and that substantially all the corn kernels are popped.

While the invention has been described with respect to one preferred embodiment, it will be appreciated that this is set forth merely for purposes of example, and that many other variations, modifications and applications of the invention may be made.

What is claimed is:

1. An appliance for cooking food articles, comprising:
   a receptacle for receiving a quantity of food articles to be cooked, and a sufficient quantity of a cooking liquid to only partially immerse the food articles therein;
   a heater for heating the cooking liquid and the food articles when received therein;
   a paddle movably mounted with respect to said receptacle so as to be movable therein;
   and a periodically-reversing drive for driving said paddle back and forth in said receptacle to move the food articles therein back and forth through said cooking liquid.

2. The appliance according to claim 1, wherein said paddle is of an open frame construction having a large opening bordered by a bottom strip which is movable back and forth along said receptacle to cause the food articles to tumble through said large opening.

3. The appliance according to claim 1, wherein said paddle is pivotally mounted with respect to said receptacle, and said periodically-reversing drive is an oscillating drive for oscillating said paddle in said receptacle.

4. The appliance according to claim 1, wherein said receptacle is of a semi-cylindrical configuration, having a pair of spaced vertical end walls, a semi-cylindrical bottom wall, and an open top; said paddle being pivotally mounted along the center line of said open top of the receptacle perpendicularly to and between said vertical end walls.

5. The appliance according to claim 1, wherein said receptacle includes a screen basket for receiving the food articles during their cooking, and for removing them from the cooking liquid.

6. The appliance according to claim 5, wherein said screen basket is of semi-cylindrical configuration, having a pair of spaced vertical end walls, a semi-cylindrical bottom wall, and an open top; said paddle being pivotally mounted along the center line of said open top of the screen basket perpendicularly between said vertical end walls.

7. The appliance according to claim 6, wherein said receptacle is of the same semi-cylindrical configuration as said screen basket receivable therein.

8. The appliance according to claim 6, wherein said screen basket includes a handle to facilitate introducing it into the receptacle and removing it from the receptacle.

9. The appliance according to claim 1, wherein said receptacle is of heavy aluminum having a high heat storage capacity.

10. The appliance according to claim 1, wherein said paddle is removably mounted to the receptacle to facilitate removing the cooked food articles from the receptacle.

11. The appliance according to claim 1, wherein said heater includes heating elements underlying the receptacle.

12. The appliance according to claim 11, wherein said heater further includes a heater lamp overlying the receptacle for illuminating its interior as well as for heating the food articles and the cooking liquid within the receptacle.

13. The appliance according to claim 1, wherein the receptacle is located within a housing which includes the drive for the paddle; said housing further including a cover which is at least partially transparent to enable viewing the contents of the receptacle.

14. The appliance according to claim 13, wherein said cover further includes a heater lamp to overlie the receptacle for illuminating its interior as well as for heating the food articles and the cooking liquid within the receptacle.

15. A method of cooking food articles, comprising:
    introducing the food articles into a receptacle;
    introducing a relatively small quantity of cooking liquid into the receptacle sufficiently only to partially immerse the food articles therein;
    heating the cooking liquid to a temperature sufficient to cook the food articles therein;
    and actuating a periodically-reversing drive for periodically driving a paddle back and forth in said receptacle to move the food articles therein back and forth through the cooking liquid.

16. The method according to claim 15, wherein said paddle is of an open frame construction such that its back and forth movement causes the food article to tumble through the paddle.

17. The method according to claim 16, wherein said cooking liquid is a frying oil, such that the back and forth movement of the paddle through the frying oil causes all the surfaces of the food articles to be crisply fried without absorbing undue quantities of the frying oil.

18. The method according to claim 16, wherein said cooking liquid is water, such that the back and forth movement of the paddle causes the food articles to be steamed.

19. The method according to claim 18, wherein said food articles are corn kernels, and said liquid is an oil, such that the back and forth movement of the paddle causes the corn kernels to pop without absorbing undue quantities of the oil.

* * * * *